US011772623B2

(12) United States Patent
Ahn et al.

(10) Patent No.: US 11,772,623 B2
(45) Date of Patent: Oct. 3, 2023

(54) ELECTRONIC HYDRAULIC BRAKE DEVICE

(71) Applicant: HYUNDAI MOBIS CO., LTD., Seoul (KR)

(72) Inventors: Sung Ki Ahn, Yongin-si (KR); Soung Jun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 143 days.

(21) Appl. No.: 16/803,567

(22) Filed: Feb. 27, 2020

(65) Prior Publication Data

US 2021/0101575 A1    Apr. 8, 2021

(30) Foreign Application Priority Data

Oct. 8, 2019   (KR) ................. 10-2019-0124501

(51) Int. Cl.
*B60T 8/40*    (2006.01)
*B60T 13/68*   (2006.01)
*B60T 13/16*   (2006.01)
*B60T 8/32*    (2006.01)
(Continued)

(52) U.S. Cl.
CPC .............. *B60T 13/683* (2013.01); *B60T 8/17* (2013.01); *B60T 8/326* (2013.01); *B60T 13/165* (2013.01); *B60T 13/18* (2013.01); *B60T 2270/402* (2013.01); *B60T 2270/404* (2013.01); *B60T 2270/82* (2013.01)

(58) Field of Classification Search
CPC .......... B60T 8/4013; B60T 8/17; B60T 8/326; B60T 8/404; B60T 8/4266; B60T 13/686; B60T 13/745; B60T 2270/402; B60T 7/042; B60T 13/662; B60T 13/74; B60T 2270/413; B60T 13/165; B60T 13/18; B60T 13/683; B60T 2270/404; B60T 2270/82

See application file for complete search history.

(56) References Cited

U.S. PATENT DOCUMENTS 6,193,329 B1 *    2/2001   Kanauchi ................ F04B 53/22
                                                      303/10
2014/0203626 A1 *  7/2014   Biller ..................... B60T 13/58
                                                      303/14
(Continued)

FOREIGN PATENT DOCUMENTS

JP          4101900 B2      6/2008
KR   10-2007-0104982 A     10/2007
(Continued)

*Primary Examiner* — Nicholas J Lane
*Assistant Examiner* — Stephen M Bowes
(74) *Attorney, Agent, or Firm* — NovoTechIP International PLLC

(57) ABSTRACT

An electronic hydraulic brake device includes a main braking unit configured to provide a braking fluid to a plurality of wheel cylinder units by driving of a motor; a storage unit connected to the main braking unit and configured to store the braking fluid; and an auxiliary braking unit connected to the main braking unit and the storage unit and configured to provide the braking fluid to some of the plurality of wheel cylinder units when an operation error of the main braking unit occurs, so that braking of a vehicle may be stably performed by the auxiliary braking unit even though the operation error of the main braking unit occurs.

9 Claims, 7 Drawing Sheets

(51) Int. Cl.
    *B60T 8/17*        (2006.01)
    *B60T 13/18*      (2006.01)

(56) References Cited

U.S. PATENT DOCUMENTS

| | | | |
|---|---|---|---|
| 2014/0354036 A1* | 12/2014 | Koo | B60T 8/4081 |
| | | | 303/6.01 |
| 2019/0016321 A1* | 1/2019 | Dinkel | B60T 13/161 |
| 2019/0092301 A1* | 3/2019 | Jeong | B60T 8/341 |
| 2019/0308601 A1* | 10/2019 | Maj | B60T 13/168 |
| 2019/0344769 A1* | 11/2019 | Zimmermann | B60T 13/745 |
| 2020/0276963 A1* | 9/2020 | Zimmermann | B60T 13/686 |
| 2020/0406880 A1* | 12/2020 | Zimmermann | B60T 13/686 |

FOREIGN PATENT DOCUMENTS

| | | |
|---|---|---|
| KR | 10-2014-0140404 A | 12/2014 |
| KR | 10-2018-0101525 A | 9/2018 |
| KR | 10-2019-0034931 A | 4/2019 |

* cited by examiner

ELECTRONIC HYDRAULIC BRAKE DEVICE

CROSS-REFERENCE TO RELATED APPLICATION

The present application claims priority under 35 U.S.C. § 119(a) to Korean Patent Application No. 10-2019-0124501 filed on Oct. 8, 2019 in the Korean Intellectual Property Office, which is incorporated herein by reference in its entirety.

BACKGROUND

1. Technical Field

Embodiments of the present disclosure relate to an electronic hydraulic brake device, and more particularly, to an electronic hydraulic brake device capable of quickly performing auxiliary braking when an error occurs in main braking in an integrated or separate braking system.

2. Related Art

In general, an electronic hydraulic brake device adjusts the braking pressure of each wheel by the hydraulic pressure of a master cylinder driven by a motor after the pedal pressure of a driver is detected by a sensor.

The electronic hydraulic brake device includes a sensor that detects a stroke distance of a pedal such that the driver knows desired braking pressure.

Furthermore, the electronic hydraulic brake device includes a pedal travel simulator that allows the driver to feel the same pedal pressure as in a general hydraulic brake device.

Accordingly, when the driver presses a brake pedal, an electronic control unit detects the pedal pressure and supplies the pedal pressure to the master cylinder.

Then, the master cylinder delivers braking pressure to each wheel cylinder of each wheel, thereby providing braking force to each wheel.

Since the related electronic hydraulic brake device does not quickly provide braking pressure to the wheel cylinder when a motor is damaged, an accident may be caused. In this regard, there is a need for solving such a problem.

The related art of the present disclosure is disclosed in Korean Patent Application Laid-Open No. 2007-0104982 published on Oct. 30, 2007, entitled 'Control Apparatus for Valve in Electro-Hydraulic Brake System'.

SUMMARY

Various embodiments are directed to providing an electronic hydraulic brake device capable of quickly performing auxiliary braking when an error occurs in main braking in an integrated or separate braking system.

In an embodiment, an electronic hydraulic brake device may include: a main braking unit configured to provide a braking fluid to a plurality of wheel cylinder units by driving of a motor; a storage unit connected to the main braking unit configured to store the braking fluid; and an auxiliary braking unit connected to the main braking unit and the storage unit configured to provide the braking fluid to some of the plurality of wheel cylinder units when an operation error of the main braking unit occurs.

The main braking unit may include: a pedal cylinder unit configured to generate hydraulic pressure by pressing of a pedal; a master cylinder unit configured to detect the pedal and generate hydraulic pressure by the driving of the motor; a first main hydraulic unit connected to the master cylinder unit configured to guide the braking fluid to some of the plurality of wheel cylinder units; a second main hydraulic unit configured to connect the master cylinder unit and the auxiliary braking unit and guide the braking fluid to the rest of the plurality of wheel cylinder units; and a third main hydraulic unit configured to connect or disconnect the first main hydraulic unit and the second main hydraulic unit.

The first main hydraulic unit may guide the braking fluid to the wheel cylinder units disposed on rear wheels, and the second main hydraulic unit may guide the braking fluid to the wheel cylinder units disposed on front wheels.

The first main hydraulic unit and the auxiliary braking unit may be connected to each other, so that movement of the braking fluid is possible.

The auxiliary braking unit may include: a first auxiliary fluid path part connected to the second main hydraulic unit and having a fluid path opened and closed by a first valve part to guide the braking fluid; a second auxiliary fluid path part configured to connect the first valve part and an electric pump part to guide the braking fluid; a third auxiliary fluid path part configured to connect the storage unit and the electric pump part and having a fluid path opened and closed by a third valve part to guide the braking fluid; a fourth auxiliary fluid path part connected to the second auxiliary fluid path part and having a fluid path opened and closed by a fourth valve part to guide the braking fluid; a fifth auxiliary fluid path part connected to the fourth valve part and having a fluid path opened and closed by a fifth valve part to guide the braking fluid; and a sixth auxiliary fluid path part configured to connect the fifth auxiliary fluid path part and the wheel cylinder units to guide the braking fluid.

The auxiliary braking unit may further include a seventh auxiliary fluid path part configured to connect the fifth valve part and the third auxiliary fluid path part to guide the braking fluid.

The first valve part and the fourth valve part may be normally open valves and the third valve part and the fifth valve part may be normally closed valves.

The electronic hydraulic brake device may further include a recovery unit configured to connect the main braking unit and the auxiliary braking unit and induce the braking fluid of the main braking unit to be detoured to the storage unit when the operation error of the main braking unit occurs.

The recovery unit may include: one or more recovery fluid path parts configured to connect the main braking unit and the auxiliary braking unit; and a recovery valve part formed in the recovery fluid path part and configured to open and close a fluid path.

The recovery valve part may be a normally closed valve.

According to the electronic hydraulic brake device in accordance with the present disclosure, the main braking unit and the auxiliary braking unit can be connected by a hydraulic circuit and when an operation error of the main braking unit occurs, the auxiliary braking unit can be driven to perform braking.

DETAILED DESCRIPTION

Hereinafter, embodiments of an electronic hydraulic brake device in accordance with the present disclosure will be described with reference to the accompanying drawings. In describing the electronic hydraulic brake device, it should be noted that the drawings are not to precise scale and may be exaggerated in thickness of lines or sizes of components for descriptive convenience and clarity only. Furthermore, the terms used herein are defined by taking functions of the disclosure into account and can be changed according to the custom or intention of users or operators. Therefore, definition of the terms should be made according to the overall disclosures set forth herein.

Figure 1:
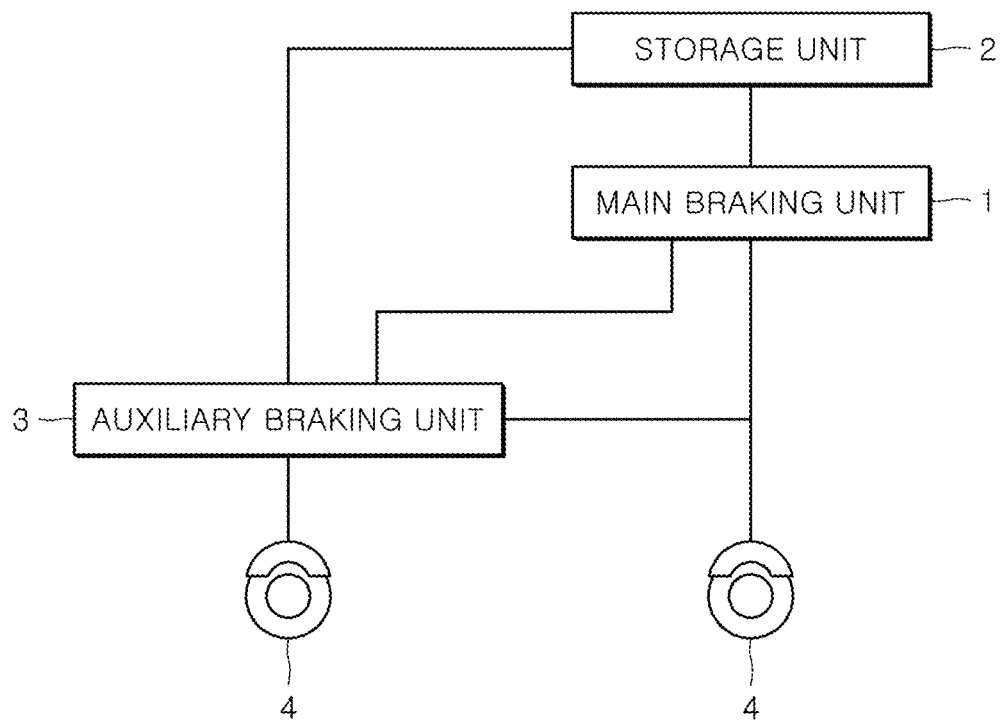
FIG. 1 is a block diagram schematically illustrating an electronic hydraulic brake device in accordance with an embodiment of the present disclosure.
Figure 2:
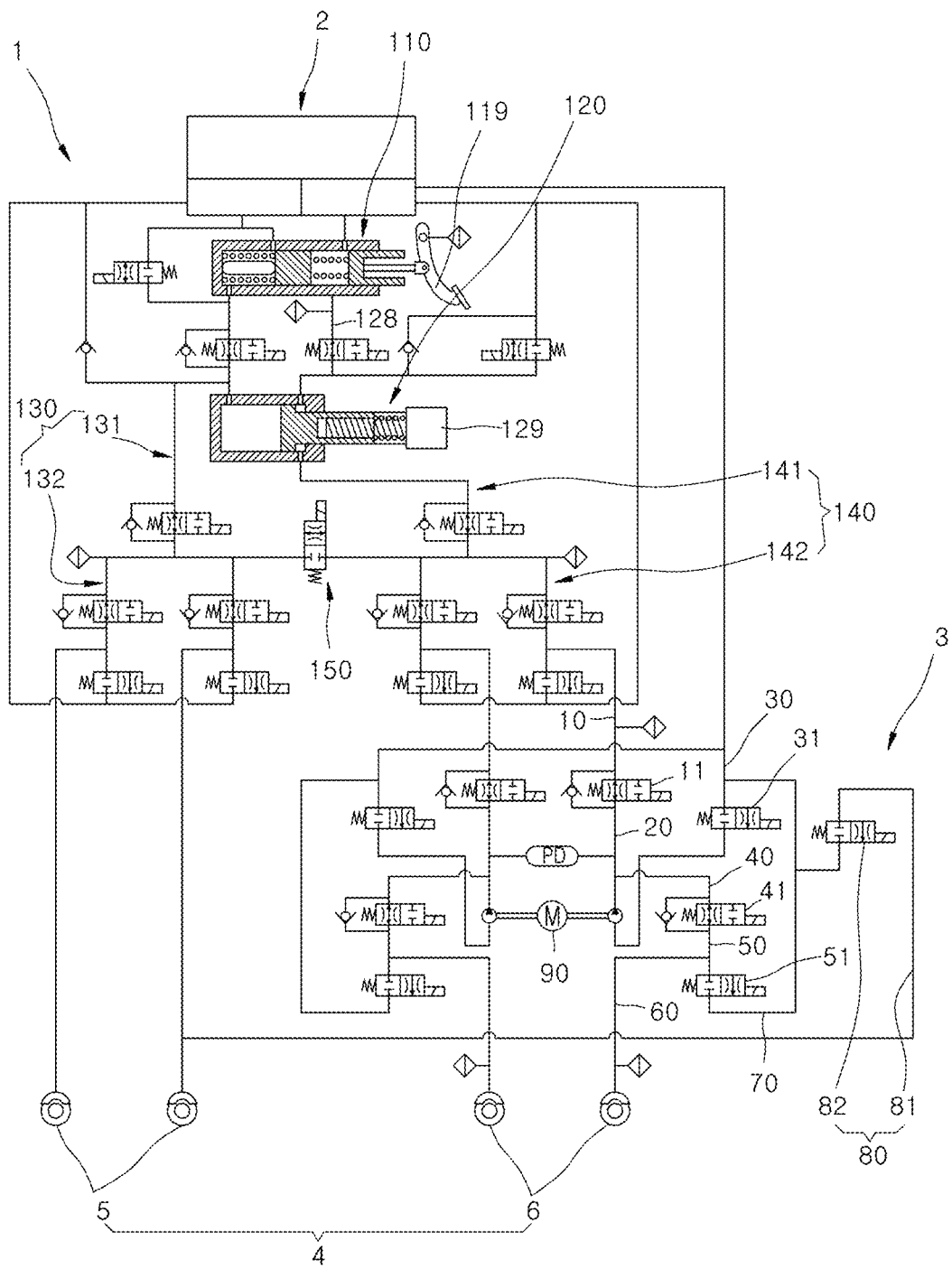
FIG. 2 is a diagram schematically illustrating the electronic hydraulic brake device in accordance with an embodiment of the present disclosure.

FIG. 1 is a block diagram schematically illustrating an electronic hydraulic brake device in accordance with an embodiment of the present disclosure, and FIG. 2 is a diagram schematically illustrating the electronic hydraulic brake device in accordance with an embodiment of the present disclosure. Referring to FIG. 1 and FIG. 2, the electronic hydraulic brake device in accordance with an embodiment of the present disclosure includes a main braking unit 1, a storage unit 2, and an auxiliary braking unit 3.

The main braking unit 1 provides a braking fluid to a plurality of wheel cylinder units 4 by driving a motor. The storage unit 2 is connected to the main braking unit 1 and temporarily stores the braking fluid. The auxiliary braking unit 3 is connected to the main braking unit 1 and the storage unit 2. The auxiliary braking unit 3 provides the braking fluid to some of the plurality of wheel cylinder units 4 when an operation error of the main braking unit 1 occurs.

That is, in the electronic hydraulic brake device in accordance with an embodiment of the present disclosure, when the operation error of the main braking unit 1 occurs in an electronic braking device of an electric vehicle, a hybrid vehicle, and an autonomous vehicle, the auxiliary braking unit 3 may operate to enable emergency braking. In such a case, the operation error of the main braking unit 1 may be impossible motor driving or operation errors of various valves for controlling a hydraulic circuit.

The main braking unit 1 in accordance with an embodiment of the present disclosure includes a pedal cylinder unit 110, a master cylinder unit 120, a first main hydraulic unit 130, a second main hydraulic unit 140, and a third main hydraulic unit 150.

The pedal cylinder unit 110 generates hydraulic pressure by pressing of a pedal 119. Such a pedal cylinder unit 110 may form two chambers and provide stepping force corresponding to the pressing of the pedal 119.

The master cylinder unit 120 detects whether the pedal 119 operates and generates hydraulic pressure by driving of a motor 129. The master cylinder unit 120 may form one chamber and the motor 129 may be driven in a forward direction or a reverse direction according to the pressurized state of the pedal 119. The master cylinder unit 120 may be connected to the pedal cylinder unit 110 through a cylinder line part 128.

The first main hydraulic unit 130 is connected to the master cylinder unit 120 and guides the braking fluid to some of the plurality of wheel cylinder units 4.

More specifically, the first main hydraulic unit 130 may include a 1-1 hydraulic line part 131 that is connected to the master cylinder unit 120 to guide the braking fluid, and a 1-2 hydraulic line part 132 that is connected to the 1-1 hydraulic line part 131 and branched to guide the braking fluid to two first wheel cylinder parts 5. The two first wheel cylinder parts 5 may be disposed on rear wheels, respectively.

The second main hydraulic unit 140 connects the master cylinder unit 120 and the auxiliary braking unit 3 and guides the braking fluid to the rest of the plurality of wheel cylinder units 4.

More specifically, the second main hydraulic unit 140 may include a 2-1 hydraulic line part 141 that is connected to the master cylinder unit 120 to guide the braking fluid, and a 2-2 hydraulic line part 142 that is connected to the 2-1 hydraulic line part 141 and branched to guide the braking fluid to the auxiliary braking unit 3. The auxiliary braking unit 3 may be connected to two second wheel cylinder parts 6. The two second wheel cylinder parts 6 may be disposed on front wheels, respectively.

Meanwhile, the first wheel cylinder parts 5 may be disposed on the front wheels, the second wheel cylinder parts 6 may be disposed on the rear wheels, and the auxiliary braking unit 3 may be connected to main power wheels in a vehicle driving method.

The third main hydraulic unit 150 connects or disconnects the first main hydraulic unit 130 and the second main hydraulic unit 140. For example, the third main hydraulic unit 150 may connect the 1-2 hydraulic line part 132 and the 2-2 hydraulic line part 142.

In addition, the first main hydraulic unit 130 may be connected to the auxiliary braking unit 3. That is, when any one of the 1-2 hydraulic line parts 132 is connected to the hydraulic circuit of the auxiliary braking unit 3, the first main hydraulic unit 130 may be controlled by the auxiliary braking unit 3 in an emergency.

The auxiliary braking unit 3 in accordance with an embodiment of the present disclosure includes a first auxiliary fluid path part 10, a second auxiliary fluid path part 20, a third auxiliary fluid path part 30, a fourth auxiliary fluid path part 40, a fifth auxiliary fluid path part 50, and a sixth auxiliary fluid path part 60.

The first auxiliary fluid path part 10 is connected to the second main hydraulic unit 140 and has a fluid path opened and closed by a first valve part 11 to guide the braking fluid. For example, two first auxiliary fluid path parts 10 may be connected to the branched 2-2 hydraulic line parts 142, respectively.

The second auxiliary fluid path part 20 connects the first valve part 11 and an electric pump part 90 to guide the braking fluid. For example, one end portion of the second auxiliary fluid path part 20 may by connected to the first valve part 11 and the other end portion thereof may by connected to the electric pump part 90. The electric pump part 90 is a device for forcibly supplying the braking fluid as power is applied, and may be driven to supply the braking fluid when an error occurs in the main braking unit 1.

The third auxiliary fluid path part 30 connects the storage unit 2 and the electric pump part 90 to guide the braking fluid. The fluid path of the third auxiliary fluid path part 30 is opened and closed by a third valve part 31. For example, one end portion of the third auxiliary fluid path part 30 may be connected to the storage unit 2, and the third auxiliary fluid path part 30 may be branched into a pair so that the other end portion thereof may be connected to the electric pump part 90.

The fourth auxiliary fluid path part 40 is connected to the second auxiliary fluid path part 20 to guide the braking fluid. The fluid path of the fourth auxiliary fluid path part 40 is opened and closed by a fourth valve part 41. For example, one end portion of the fourth auxiliary fluid path part 40 may be connected to the second auxiliary fluid path part 20. The other end portion of the fourth auxiliary fluid path part 40 may be connected to the fourth valve part 41.

The fifth auxiliary fluid path part 50 is connected to the fourth valve part 41 to guide the braking fluid. The fluid path of the fifth auxiliary fluid path part 50 is opened and closed by a fifth valve part 51. For example, one end portion of the fifth auxiliary fluid path part 50 may be connected to the fourth valve part 41 and the other end portion thereof may be connected to the fifth valve part 51.

The sixth auxiliary fluid path part 60 connects the fifth auxiliary fluid path part 50 and the wheel cylinder units 4 to guide the braking fluid. For example, one end portion of the sixth auxiliary fluid path part 60 may be connected to the fifth auxiliary fluid path part 50 and the other end portion thereof may be connected to the second wheel cylinder part 6.

The auxiliary braking unit 3 in accordance with an embodiment of the present disclosure may further include a seventh auxiliary fluid path part 70. The seventh auxiliary fluid path part 70 connects the fifth valve part 51 and the third auxiliary fluid path part 30 to guide the braking fluid.

The first valve part 11 and the fourth valve part 41 are normally open valves and the third valve part 31 and the fifth valve part 51 are normally closed valves.

That is, when power is not applied, the first valve part 11 and the fourth valve part 41 may permit movement of the braking fluid by opening the fluid paths, and when the power is applied, the first valve part 11 and the fourth valve part 41 may limit the movement of the braking fluid by closing the fluid paths.

Furthermore, when the power is not applied, the third valve part 31 and the fifth valve part 51 may limit the movement of the braking fluid by closing the fluid paths, and when the power is applied, the third valve part 31 and the fifth valve part 51 may permit the movement of the braking fluid by opening the fluid paths.

The electronic hydraulic brake device in accordance with an embodiment of the present disclosure may further include a recovery unit 80. The recovery unit 80 connects the main braking unit 1 and the auxiliary braking unit 3 and induces the braking fluid of the main braking unit 1 to be detoured to the storage unit 2 when the operation error of the main braking unit 1 occurs.

More specifically, the recovery unit 80 includes a recovery fluid path part 81 and a recovery valve part 82. One or more recovery fluid path parts 81 connect the main braking unit 1 and the auxiliary braking unit 3, and the recovery valve part 82 is formed in the recovery fluid path part 81 to open and close a fluid path. As the recovery valve part 82, a normally closed value is used. That is, when power is not applied, the recovery valve part 82 may limit the movement of the braking fluid by closing the recovery fluid path part 81, and when the power is applied, the recovery valve part 82 may permit the movement of the braking fluid by opening the recovery fluid path part 81.

For example, the recovery fluid path part 81 may connect the first main hydraulic unit 130 and the seventh auxiliary fluid path part 70 to guide the braking fluid. In such a case, the recovery fluid path part 81 may be connected to any one of two seventh auxiliary fluid path parts 70.

Figure 3:
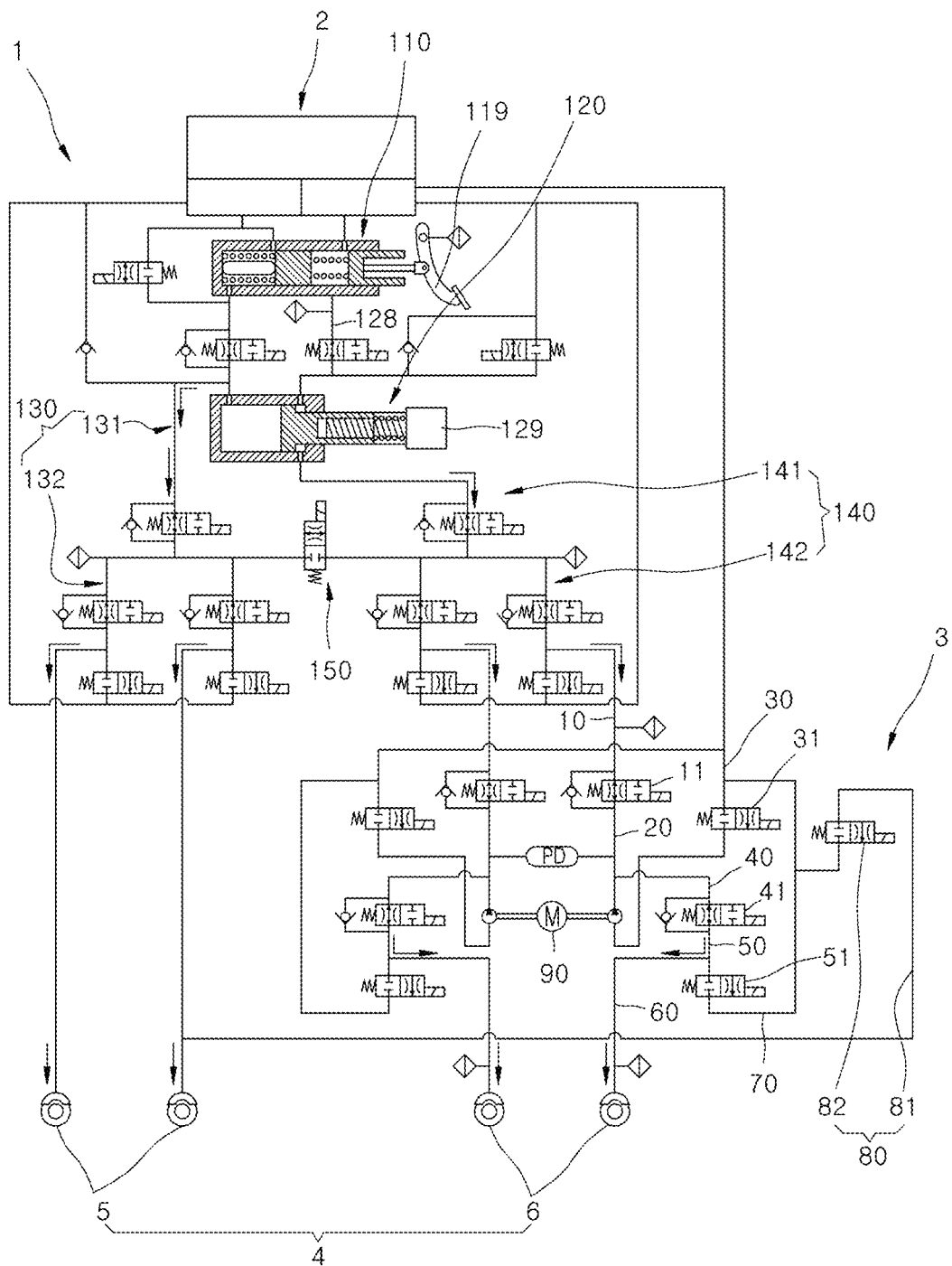
FIG. 3 is a diagram schematically illustrating a normal operation state of a main braking unit in the electronic hydraulic brake device in accordance with an embodiment of the present disclosure.

FIG. 3 is a diagram schematically illustrating a normal operation state of the main braking unit in the electronic hydraulic brake device in accordance with an embodiment of the present disclosure. Referring to FIG. 3, in a case where the main braking unit 1 is in a normal state, when the pedal 119 is pressed or braking is required through an autonomous driving system, the motor 129 of the master cylinder unit 120 is driven. Then, hydraulic pressure generated in the master cylinder unit 120 is amplified and the braking fluid is supplied to the first main hydraulic unit 130 and the second main hydraulic unit 140.

The braking fluid having passed through the first main hydraulic unit 130 is supplied to the first wheel cylinder parts 5, so that rear wheel braking is performed. Furthermore, the braking fluid having passed through the second main hydraulic unit 140 passes through the auxiliary braking unit 3 and is supplied to the second wheel cylinder parts 6, so that front wheel braking is performed.

At this time, in the auxiliary braking unit 3, the first valve part 11 and the fourth valve part 41 open the fluid paths and the third valve part 31, the fifth valve part 51, and the recovery valve part 82 close the fluid paths. Therefore, the braking fluid may reach the second wheel cylinder parts 6 even though the electric pump part 90 is not driven.

Figure 4:
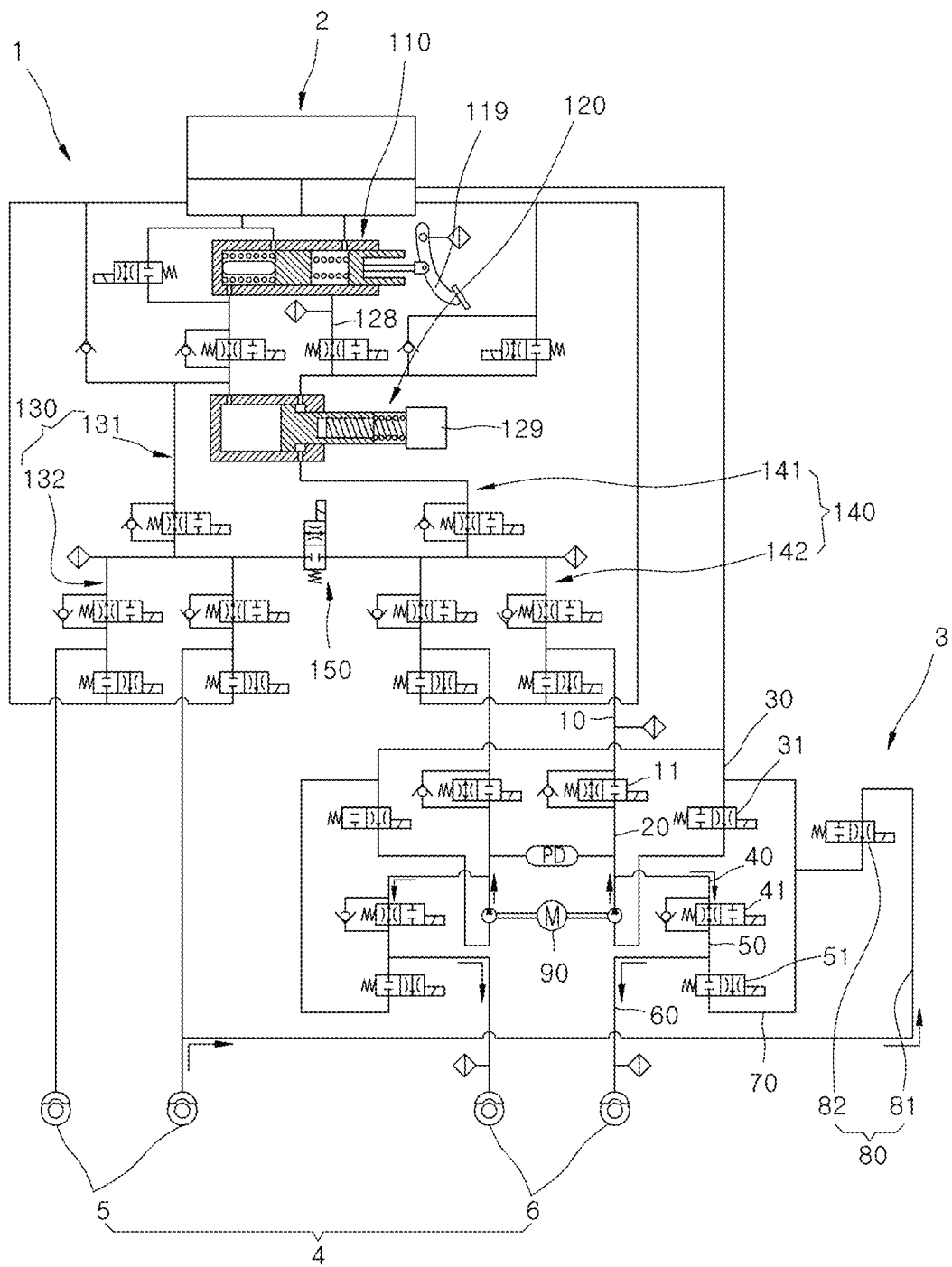
FIG. 4 is a diagram schematically illustrating an operation state of an auxiliary braking unit when the main braking unit is in an abnormal operation state and a driver intervenes in the electronic hydraulic brake device in accordance with an embodiment of the present disclosure.

FIG. 4 is a diagram schematically illustrating an operation state of the auxiliary braking unit when the main braking unit is in an abnormal operation state and a driver intervenes in the electronic hydraulic brake device in accordance with an embodiment of the present disclosure.

Referring to FIG. 4, when a driver presses the pedal 119 during an abnormal operation of the main braking unit 1, hydraulic pressure generated in the pedal cylinder unit 110 is supplied to the first wheel cylinder parts 5. At this time, the recovery valve part 82 opens the recovery fluid path part 81 such that electric motor braking is performed for the rear wheels. Accordingly, the braking fluid supplied to the first wheel cylinder parts 5 may be moved to the storage unit 2 through the recovery fluid path part 81 to decompress the first wheel cylinder parts 5.

Meanwhile, the first valve part 11 closes the first auxiliary fluid path part 10 and the fourth valve part 41 opens the fourth auxiliary fluid path part 40. Furthermore, the third valve part 31 opens the third auxiliary fluid path part 30 and the fifth valve part 51 closes the fifth auxiliary fluid path part 50.

When the electric pump part 90 is driven in the above state, the braking fluid supplied from the storage unit 2 is discharged from the electric pump part 90 and then is supplied to the second wheel cylinder parts 6, so that front wheel braking may be performed.

Figure 5:
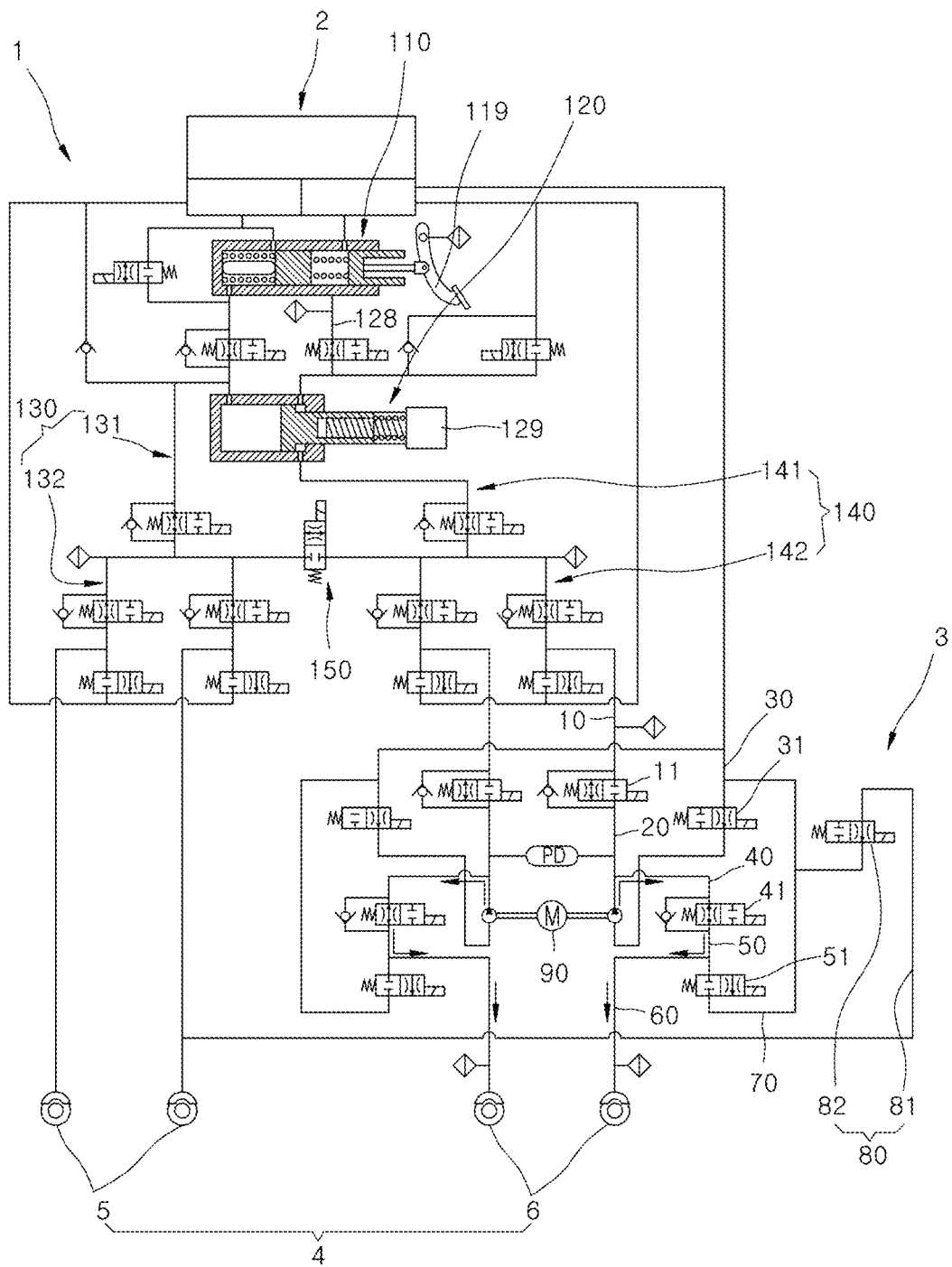
FIG. 5 is a diagram schematically illustrating an operation state of the auxiliary braking unit when the main braking unit is in the abnormal operation state and the driver does not intervene in the electronic hydraulic brake device in accordance with an embodiment of the present disclosure.

FIG. 5 is a diagram schematically illustrating an operation state of the auxiliary braking unit when the main braking unit is in an abnormal operation state and a driver does not intervene in the electronic hydraulic brake device in accordance with an embodiment of the present disclosure.

Referring to FIG. 5, when an abnormal state of the main braking unit 1 occurs in an autonomous driving process, electric motor braking may be formed for the rear wheels. At this time, the recovery valve part 82 may open the recovery fluid path part 81.

Meanwhile, the first valve part 11 closes the first auxiliary fluid path part 10 and the fourth valve part 41 opens the fourth auxiliary fluid path part 40. Furthermore, the third valve part 31 opens the third auxiliary fluid path part 30 and the fifth valve part 51 closes the fifth auxiliary fluid path part 50.

When the electric pump part 90 is driven in the above state, the braking fluid supplied from the storage unit 2 is discharged from the electric pump part 90 and then is supplied to the second wheel cylinder parts 6, so that front wheel braking may be performed.

Figure 6:
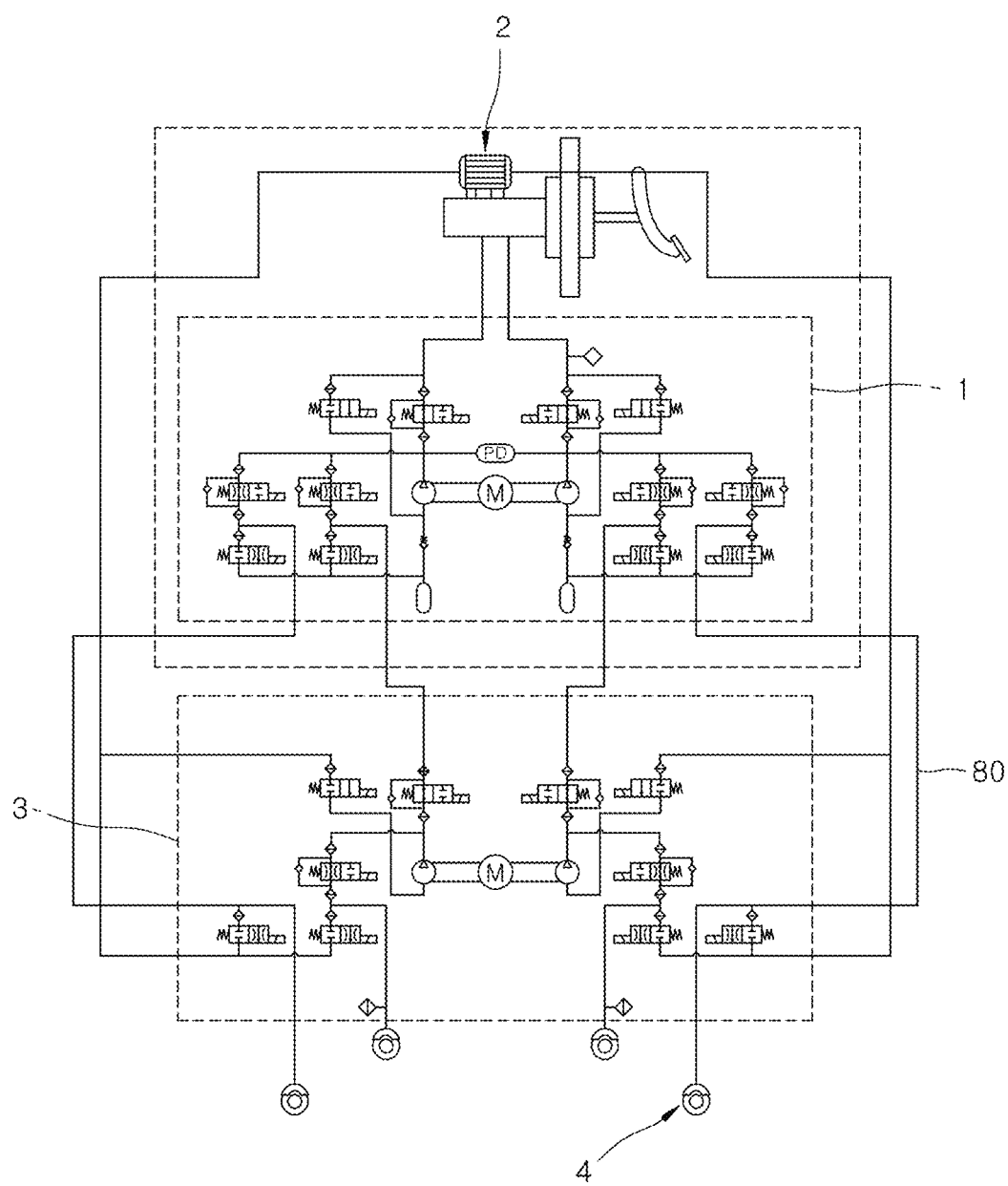
FIG. 6 is a diagram schematically illustrating an electronic hydraulic brake device in accordance with another embodiment of the present disclosure.
Figure 7:
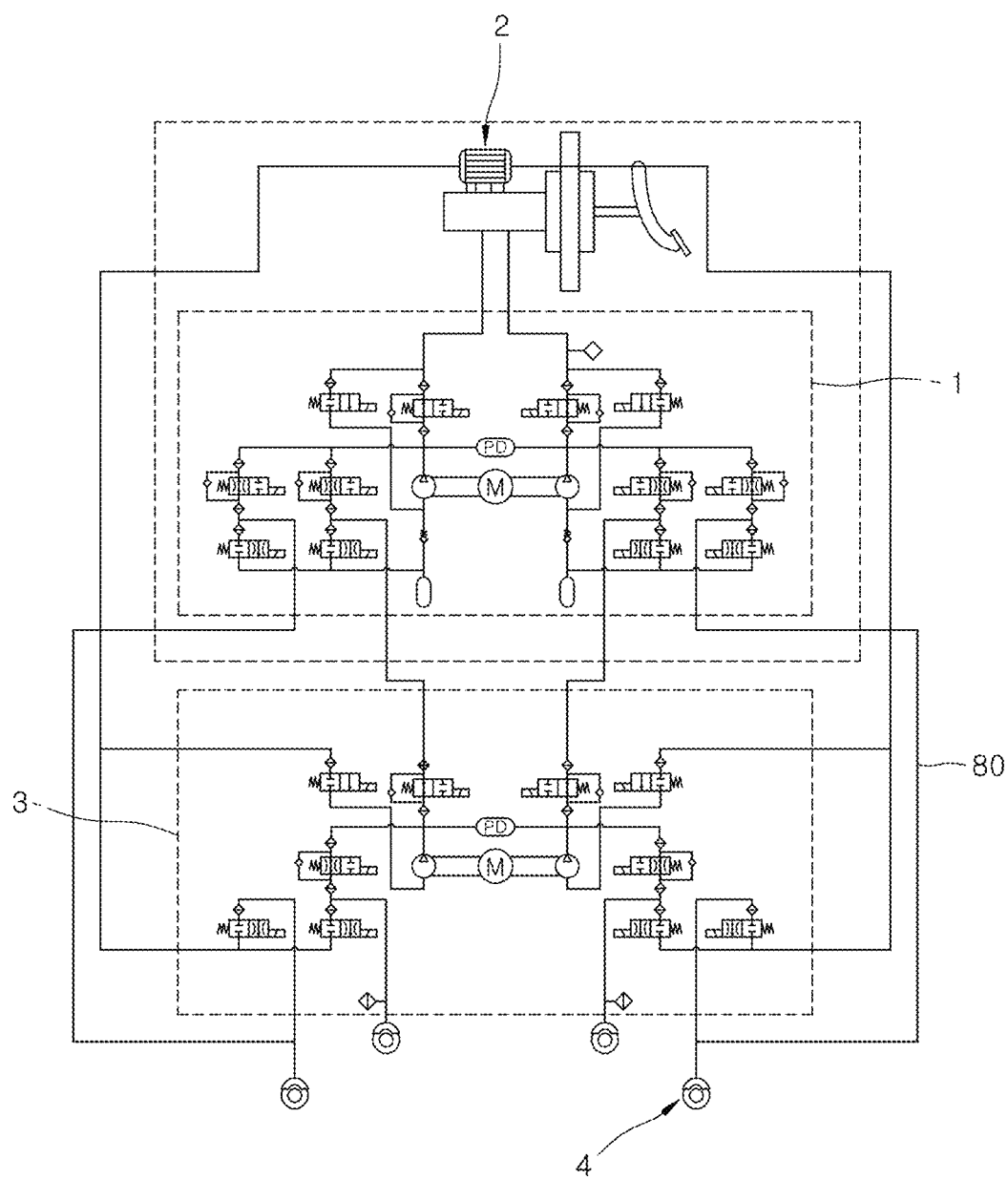
FIG. 7 is a diagram schematically illustrating an electronic hydraulic brake device in accordance with further another embodiment of the present disclosure.

FIG. 6 is a diagram schematically illustrating an electronic hydraulic brake device in accordance with another embodiment of the present disclosure, and FIG. 7 is a diagram schematically illustrating an electronic hydraulic brake device in accordance with further another embodiment of the present disclosure. Referring to FIG. 6 and FIG. 7, at least one braking fluid from the main braking unit 1 is provided to the wheel cylinder unit 4 via the auxiliary braking unit 3, and the braking fluid provided to the wheel cylinder unit 4 is detoured to the storage unit 2 even when there are two recovery units 80 and even in an x-split type. That is, during braking by the auxiliary braking unit 3 due to the occurrence of an error of the main braking unit 1, the wheel cylinder unit 4 not controlled by the auxiliary braking unit 3 may be controlled by another braking device such as an EPB. At this time, when a driver presses the pedal, even though the braking fluid is delivered to the wheel cylinder unit 4 not controlled by the auxiliary braking unit 3, the braking fluid may be detoured to the storage unit 2 through the recovery unit 80 to substantially prevent interference with the other braking device such as an EPB. Meanwhile, one or more wheel cylinder units 4 may be connected to the recovery unit 80, and the number of valves may be one or more according to a vehicle pipe.

In the electronic hydraulic brake device in accordance with an embodiment of the present disclosure, the main braking unit 1 and the auxiliary braking unit 3 may be connected by the hydraulic circuit and when an operation error of the main braking unit 1 occurs, the auxiliary braking unit 3 may be driven to perform braking.

Although the present disclosure have been described with reference to the embodiments illustrated in the drawings, the embodiments of the disclosure are for illustrative purposes only, and those skilled in the art will appreciate that various modifications and equivalent other embodiments are possible.

Thus, the true technical scope of the disclosure should be defined by the following claims.

What is claimed is:

1. An electronic hydraulic brake device for a vehicle having a plurality of wheels including front wheels and rear wheels, the electronic hydraulic brake device comprising:
    a main braking unit configured to provide a braking fluid to a plurality of wheel cylinder units by driving of a motor;
    a storage unit connected to the main braking unit and configured to store the braking fluid;
    an auxiliary braking unit connected to the main braking unit and the storage unit and configured to provide the braking fluid to some of the plurality of wheel cylinder units when an operation error of the main braking unit occurs, wherein the storage unit is external to the auxiliary braking unit; and
    a recovery unit configured to connect the main braking unit and the auxiliary braking unit and cause the braking fluid from the main braking unit to be detoured to the storage unit when the operation error of the main braking unit occurs,
    wherein one of the wheel cylinder units connected to the main braking unit is configured to perform electric motor braking in response to the braking fluid from the main braking unit being detoured to the storage unit,
    wherein the plurality of wheel cylinder units include:
        a pair of first wheel cylinder units provided for the rear wheels and supplied with the braking fluid from the main brake unit, and
        a pair of second wheel cylinder units provided for the front wheels and supplied with the braking fluid from the auxiliary brake unit, and
    wherein, when the operational error of the main braking unit occurs, the braking fluid supplied to one of the first wheel cylinder units is moved to the storage unit through the recovery unit.

2. The electronic hydraulic brake device according to claim 1, wherein the main braking unit comprises:
    a pedal cylinder unit configured to generate hydraulic pressure by pressing of a pedal;
    a master cylinder unit configured to detect the pedal and generate hydraulic pressure by the driving of the motor;
    a first main hydraulic unit connected to the master cylinder unit and configured to guide the braking fluid to some of the plurality of wheel cylinder units;
    a second main hydraulic unit configured to connect the master cylinder unit and the auxiliary braking unit and guide the braking fluid to the rest of the plurality of wheel cylinder units; and
    a third main hydraulic unit configured to connect or disconnect the first main hydraulic unit and the second main hydraulic unit.

3. The electronic hydraulic brake device according to claim 2, wherein:
    the first main hydraulic unit guides the braking fluid to the pair of first wheel cylinder units, and
    the second main hydraulic unit guides the braking fluid to the pair of second wheel cylinder units.

4. The electronic hydraulic brake device according to claim 2, wherein the first main hydraulic unit and the auxiliary braking unit are connected to each other, so that movement of the braking fluid is possible.

5. The electronic hydraulic brake device according to claim 1, wherein the recovery unit comprising:
    one or more recovery fluid path parts configured to connect the main braking unit and the auxiliary braking unit; and
    a recovery valve part formed in the recovery fluid path part and configured to open and close a fluid path.

6. The electronic hydraulic brake device according to claim 5, wherein the recovery valve part is a normally closed valve.

7. An electronic hydraulic brake device comprising:
    a main braking unit configured to provide a braking fluid to a plurality of wheel cylinder units by driving of a motor;
    a storage unit connected to the main braking unit and configured to store the braking fluid; and an auxiliary braking unit connected to the main braking unit and the storage unit and configured to provide the braking fluid to some of the plurality of wheel cylinder units when an operation error of the main braking unit occurs, wherein the main braking unit comprises:
- a pedal cylinder unit configured to generate hydraulic pressure by pressing of a pedal;
- a master cylinder unit configured to detect the pedal and generate hydraulic pressure by the driving of the motor;
- a first main hydraulic unit connected to the master cylinder unit and configured to guide the braking fluid to some of the plurality of wheel cylinder units;
- a second main hydraulic unit configured to connect the master cylinder unit and the auxiliary braking unit and guide the braking fluid to the rest of the plurality of wheel cylinder units; and
- a third main hydraulic unit configured to connect or disconnect the first main hydraulic unit and the second main hydraulic unit, and wherein the auxiliary braking unit comprises:
- a first auxiliary fluid path part connected to the second main hydraulic unit and having a fluid path opened and closed by a first valve part to guide the braking fluid;
- a second auxiliary fluid path part configured to connect the first valve part and an electric pump part to guide the braking fluid;
- a third auxiliary fluid path part configured to connect the storage unit and the electric pump part and having a fluid path opened and closed by a third valve part to guide the braking fluid;
- a fourth auxiliary fluid path part connected to the second auxiliary fluid path part and having a fluid path opened and closed by a fourth valve part to guide the braking fluid;
- a fifth auxiliary fluid path part connected to the fourth valve part and having a fluid path opened and closed by a fifth valve part to guide the braking fluid; and
- a sixth auxiliary fluid path part configured to connect the fifth auxiliary fluid path part and the wheel cylinder units to guide the braking fluid.

8. The electronic hydraulic brake device according to claim 7, the auxiliary braking unit further comprises:
- a seventh auxiliary fluid path part configured to connect the fifth valve part and the third auxiliary fluid path part to guide the braking fluid.

9. The electronic hydraulic brake device according to claim 8, wherein the first valve part and the fourth valve part are normally open valves and the third valve part and the fifth valve part are normally closed valves.

* * * * *